USA United States Patent [19]
Frantz

[11] 3,888,063
[45] June 10, 1975

[54] FASTENINGS AND CORNER JOINTS
[75] Inventor: Robert Houston Frantz, Carlisle, Pa.
[73] Assignee: AMP Incorporated, Harrisburg, Pa.
[22] Filed: Jan. 29, 1971
[21] Appl. No.: 110,908

[52] U.S. Cl. .............................. 52/753 D; 52/656
[51] Int. Cl. ............................................ F16b 7/00
[58] Field of Search ...... 287/54 A, 54 B, 54 C, 189,
287/36 H, 64, 65, 109, 20.3, 20.92 C, 20.92
D; 52/656, 726, 730, 732

[56] References Cited
UNITED STATES PATENTS

| | | | |
|---|---|---|---|
| 2,576,260 | 11/1951 | Metts | 287/189.36 H X |
| 2,695,084 | 11/1954 | Milone | 287/189.36 H X |
| 2,701,040 | 2/1955 | Wick | 287/189.36 H |
| 2,804,952 | 9/1957 | Northdurft | 287/189.36 H |
| 2,981,382 | 4/1961 | Keller | 287/189.36 H X |
| 3,392,947 | 7/1968 | Keliehor | 287/54 A |
| 3,425,726 | 2/1969 | Muller | 287/54 A |
| 3,601,430 | 8/1971 | Zwennis | 287/54 A |

FOREIGN PATENTS OR APPLICATIONS

| | | | |
|---|---|---|---|
| 514,928 | 11/1939 | United Kingdom | 287/189.36 H |

Primary Examiner—Richard J. Scanlon, Jr.
Assistant Examiner—Wayne L. Shedd
Attorney, Agent, or Firm—F. W. Raring; Jay L. Seitchik; W. J. Keating

[57] ABSTRACT

Corner joint is formed among three structural members by positioning two of the members against each other and positioning a third member in abutting relationship to the first two members. A three-armed connecting member or bracket is located against stop surfaces on the members and secured thereto so that the three members are ridgedly held in fixed relationship to each other. Improved fastening in accordance with the invention is formed by positioning a fastening member or connector member between two opposed surfaces of another member such as a structural member for a corner joint. A sidewall on the structural member is permanently deformed into a recess in the connector member in a manner such that the connector member and the structural member cannot move relative to each other in any direction.

19 Claims, 21 Drawing Figures

PATENTED JUN 10 1975 3,888,063

SHEET 1

FASTENINGS AND CORNER JOINTS

BACKGROUND OF THE INVENTION

This invention relates to improved fastenings and to improved corner joints for frame or other structures. Fastenings in accordance with the instant invention can be used to its advantage in corner joints in accordance with the instant invention can be used to its advantage in corner joints in accordance with the instant invention, however, fastenings in accordance with the instant invention can also be used to advantage under other circumstances and in other environments. Conversely, corner joints in accordance with the invention may be formed with fastening methods other than the fastening of the instant invention.

The following prior U.S. patents are indicative of the state of the corner joint and fastening arts in relation to the instant invention.

| Finkenstein et al | 3,357,727 | 287/54 |
| Humble | 3,144,265 | 287/54 |
| Beckman | 3,351,367 | 287/189.36 |
| Hagerty et al | 2,861,659 | 189/36 |
| Sharp | 2,101,349 | 189/36 |
| Northdurft | 2,804,952 | 189/36 |
| Casebolt | 2,996,159 | 189/36 |

A variety of connecting devices and fastening have been proposed for forming corner joints among two or three structural members such as the structural members of a two-dimensional picture frame or a corner joint among three elements for a cabinet or the like. The connecting devices adapted to connect three structural members usually require separate fasteners such as screws. Furthermore, these connecting devices for three element joints usually require that the ends of the structural members forming the joint be square and the connecting devices of the prior art do not permit the use of mitered joints. The connecting devices for two element joints such as picture frames permit the use of mitered joints and in some instances, the two structural members can be permanently connected by a crimping operation. However, the fastenings in the joint are usually such that the principles cannot be applied to corner joints among three structural members; see for example, Northdurft U.S. Pat. No. 2,804,952 and Sharp U.S. Pat. No. 2,101,349. The U.S. Pat. to Finkenstein et al. No. 3,357,727 teaches the formation of a corner joint by means of a connecting device which is secured to the structural members by a swaging or drawing operation. A separate fastener is thus not required, however, the connector shown in this patent is not adapted to be used where mitered joints are required and structural members forming the joint must be of a particular shape.

In accordance with one aspect to the instant invention, a corner joint for a cabinet or the like is formed among three structural members, two of which may be mitered, if desired, and which abutt each other to form an angle in a first plane. The third member extends normally of this plane and is in abutting relationship to the first named members. In accordance with a preferred embodiment of the invention, the structural members comprise aluminum extrusions or other metallic members having strengthening ribs on their surfaces between which or against which the connecting member is located. The ribs are deformed into recesses in the connecting member to secure the structural member to the connecting member and thereby secure the structural members to each other.

In accordance with another aspect of the invention, a fastening is formed between two members by positioning part of one member between two opposed surfaces of the other member and indenting the thin wall of the first member into a recess in a second member. The form of the recess and the indentation is such that no relative movement of either member with respect to the other can take place. Fastenings of this type can be used in a variety of circumstances other than corner joints in accordance with the instant invention.

It is accordingly an object of the invention to provide an improved fastening between two members. A further object is to provide a fastening which is formed by indentation of one member into the other. A still further object is to provide an improved connecting member for forming corner joints. A still further object is to provide a corner joint among three or more structural members which can be formed by a simple crimping operation.

These and other objects of the invention are achieved in a preferred embodiment thereof which is briefly described in the aforegoing abstract, which is described in detail in the specification which follows, and which is shown in the accompanying drawing in which:

Figure 1:
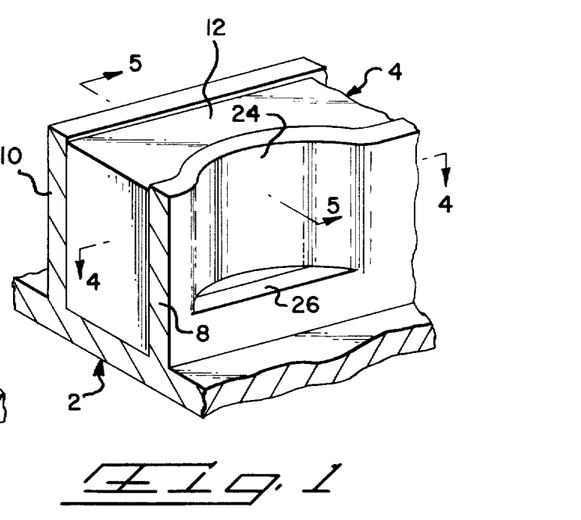
FIG. 1 is a perspective fragmentary view of a typical fastening between two members in accordance with the invention.
Figure 9:
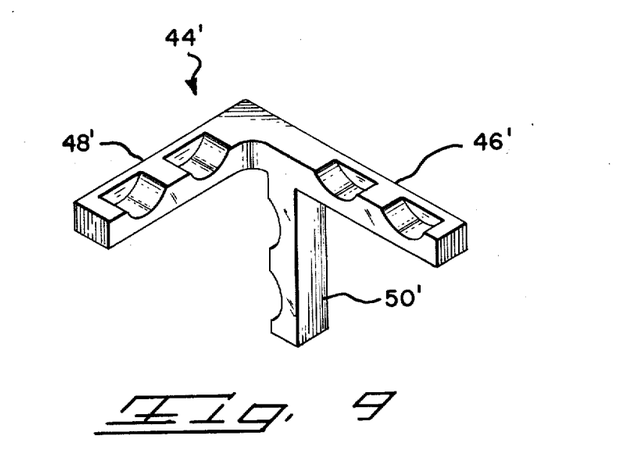
FIG. 9 is a perspective view of the joint connector used to form the joint of FIG. 8.

FIG. 1 shows a typical fastening in accordance with the invention between two member 2, 4. The member 2 may comprise, for example, an aluminum extrusion having a base or web 6 and a pair of parallel ribs 8, 10 extending therefrom. The member 4 comprises a relatively hard block having top and side surfaces 12, 14 and having a width such that it fits relatively snugly between the opposed faces of the ribs 8, 10. A generally arcuate or semi-cylindrical recess 18 extends inwardly on the side 14 of the member 4 and partially downwardly so that an upwardly directed surface 20 is provided at the inner end of this recess. It is important to note that the recess extends only partially downwardly on the side 14 so that the side 14 is uninterrupted as shown at 22 adjacent to the base of the member 4. It should also be noted that the shoulder or side 14 is inclined downwardly, as is apparent from FIG. 9, for reasons which will be explained below.

When a fastening in accordance with the invention is to be formed, the member 4 is fitted between the ribs 8 and the portion 24' of the rib 8 (FIG. 3) which is in front of the recess 18 is deformed inwardly. During such deformation, the rib 8 is preferably severed or sheared as shown at 26 at a location corresponding to the location of the edge 21 on the side 14 of the member 4. This shearing is carried out by a suitable crimping tool, which is described below, which cooperates with the edge 21 to shear the sidewall during crimping.

Figures 3, 4, 5:
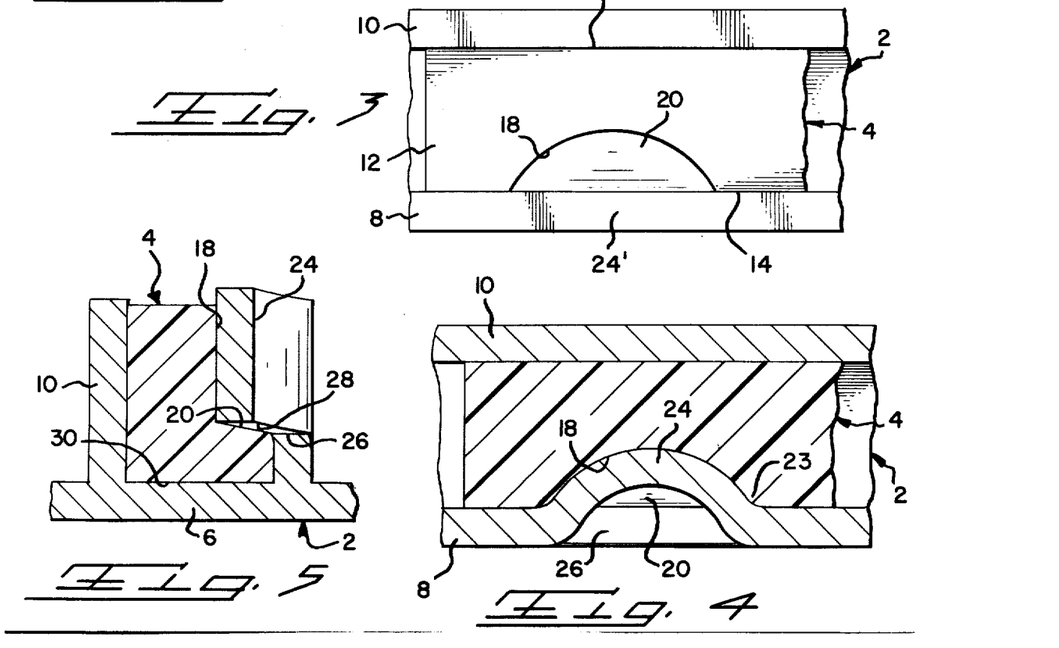
FIG. 3 is a fragmentary top plan view of the two members of FIG. 1 prior to their being secured to each other.
FIGS. 4 and 5 are views taken along the lines 4—4 and 5—5 of FIG. 1.

After inward deformation of the portion 24 of the rib 8, the member 4 will be prevented from moving in any direction relative to the member 2 as will be apparent from FIGS. 4 and 5. The inwardly deformed section 24 of the rib prevents rightward or leftward movement of the member 4 with respect to the member 2 as is apparent from FIG. 4. The downwardly facing edge 28 of this inwardly deformed section of the rib bears against the surface 20 of the recess 18 and thereby prevents upward movement of the member 4 with respect to the member 2. The parts are thus firmly secured to each other and no relative movement can take place.

For best results, the member 4 should be snugly fitted between the ribs 8, 10 of the member 2. The inclined surface of the shoulder 21 insures snug seating of the member 4 against the upper surface of the web 6 of member 2 in that as the material 24' of the rib 8 is deformed inwardly, it moves over and upwardly inclined surface 20 and cams the member 4 downwardly so that its underside 30 is snugly against the surface of the web.

The fastening of FIGS. 1–5 can be made with a variety of materials. The member 2 should have at least one deformable rib or wall thereon so that the indentation can be formed as explained above. A variety of metals may comprise the member 2, for example, aluminum or steel. Aluminum is particularly suitable in that many aluminum alloys can be deformed or crimped in relatively thick sections and a substantial edge 28 will be formed to bear against the surface 20. For example, the member 2 may be of aluminum alloy 6063 (Mg-0.45–0.9%, Si 0.2 to 0.6%, balance substantially all Al) in temper T4 or T5. The member 2 also might be formed from certain plastics, particularly of the types which can be deformed without fracture. The member 4 is of a relatively hard material and may therefore be a suitable metal or hard plastic. Good results can be obtained, for example, with a glass-filled (30–50%) nylon. A degree of hardness in this member is essential because of the fact that the edge 21 at the bottom of the recess 18 functions as a shearing edge when the sidewall portion or rib portion 24 is deformed inwardly as shown in FIGS. 3 and 4. It is also desirable that the member 4 be of a material which will flow under relatively high pressures in order to ensure a snug fit of this member between the ribs 8, 10 after formation of the indentation 18. As shown in FIG. 4, an extremely close or snug fit is obtained at 23 between the members 2, 4 after deformation of the rib 8 and this close fit is achieved by slight deformation of the member 4.

The member 4 and the member 2 may comprise extensions of a wide variety of other parts which are to be joined to each other. In the description which follows, a variety of corner joints composed of three structural members and a connector member are described in which the structural members are secured to the connector member by fastenings of the types shown in FIGS. 1–5. Other uses for the fastening of FIGS. 1–5, however, will be apparent to those skilled in the fastening art.

Figure 6:
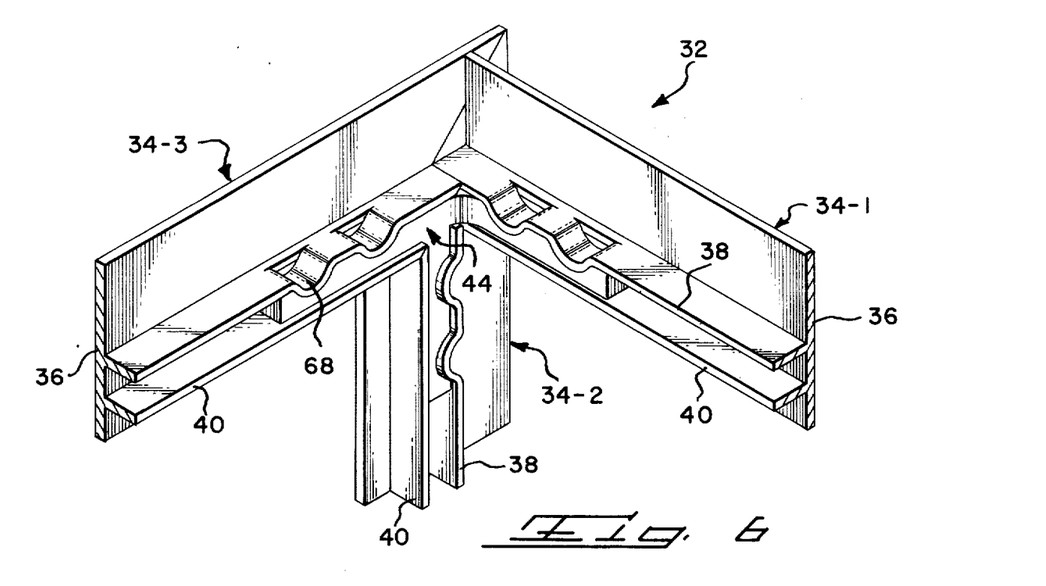
FIG. 6 is a perspective view of one form of corner joint in accordance with the invention.

FIG. 6 shows a corner joint 32 in accordance with the invention, formed by three structural members generally identified by reference numeral 34 and specifically identified as 34-1, 34-2, 34-3, and a connector member 44. These structural members are identical to each other, each having a web or base 36, and parallel ribs 38 and 40 extending from the base or web. Structural members of this type are frequently formed as aluminum extrusions and can be readily deformed to form crimped connections in accordance with the invention.

The joint of FIG. 6 is formed by mitering the structural members 34-2 and 34-3 so that they meet along the 45° line with respect to their longitudinal axes with their ribs 38, 40 in alignment. The structural member 34-1 is located against the corner formed by the members 34-2 and 34-3 and the ribs 38, 40 of the member 34-1 are in alignment with the corresponding ribs of the structural member 34-3.

A preferred form of connector member 44 for the joint 32 is formed of hard material, as noted above, such as metal or a glass-filled nylon and has first, second and third arms 46, 48 and 50 respectively. The arms 46 and 48 extend normally from each other from a common juncture and define a first reference plane. The arm 50 extends normally from the arm 46 at a location spaced from the juncture of arms 46 and 48 so that the arm 50 and the arm 46 define a second plane which extends normally of the first plane. It will be apparent from FIGS. 6 and 7 that the precise distance from the arm 50 to the corner of the connector, formed by the juncture of arms 46 and 48, is equal to the height of the ribs 38, 40 plus the thickness of one of these ribs.

Figure 7:
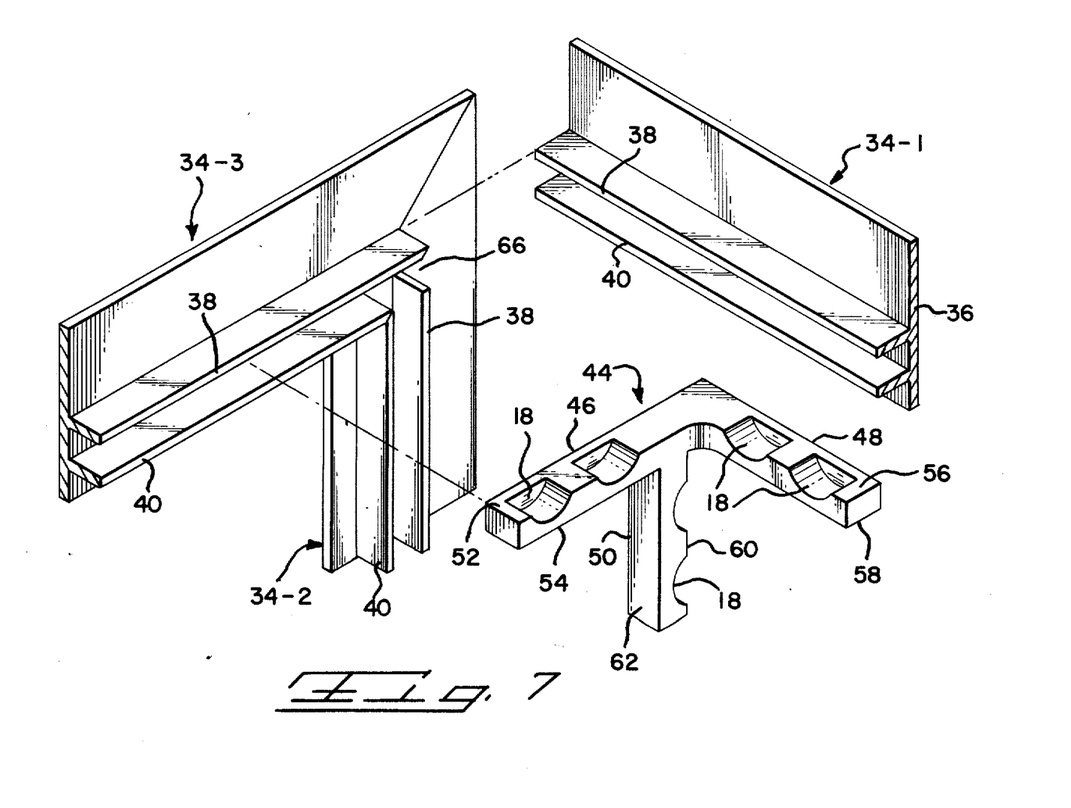
FIG. 7 is a perspective view showing the parts of the corner joint of FIG. 6 exploded from each other prior to their being secured to each other.

The upper and lower sides 52, 54 of the first arm 46 and the upper and lower sides 56, 58 of the second arm 48 extend parallel to the first plane while the sides 60, 62 of the third arm 50 extend normally of the second plane referred to above. These planes and the sides of the arms are specifically identified to locate the recesses 18 described below.

Arcuate or semi-cylindrical recesses 18 extend inwardly on the side 52 of the first arm 46, on the side 56 of the second arm 48, and on the side 60 of the third arm 50. These recesses are advantageously as described above and as shown in greater detail in FIG. 2.

When the joint 32 is formed, the structural members 34-2 and 34-3 are mitered and located against each other. Also, it is necessary to remove as short section of the rib 38 of the structural member 34-2 so that a gap 66 remains between the upper end of the rib 38 of structural member 34-2 and the righthand end of the rib 38 of the structural member 34-3. This gap should have a width sufficient to accommodate the thickness of the connector members 44 for reasons which will be apparent from the drawing.

After the members 34-2 and 34-3 are positioned against each other, the connector member is located on these two structural members with the first arm 46 between the ribs 38, 40 of the structural member 34-3 and with the third arm 50 between the ribs 38–40 with stuctural member 34-2. The ribs 38 of both structural members 34-2 and 34-3 are then crimped at 68 into the recesses 18 to form the crimped connections which secure these two structural members to each other. Thereafter, the structural member 34-1 is positioned against the structural members 34-2 and 34-3 the second arm 48 of the connector member 44 is positioned between the ribs 38, 40 of structural member 34-1 and crimped connections 68 are formed between the rib 38 of this second arm of the connector 44 and the structural member 34-1.

Figure 8:
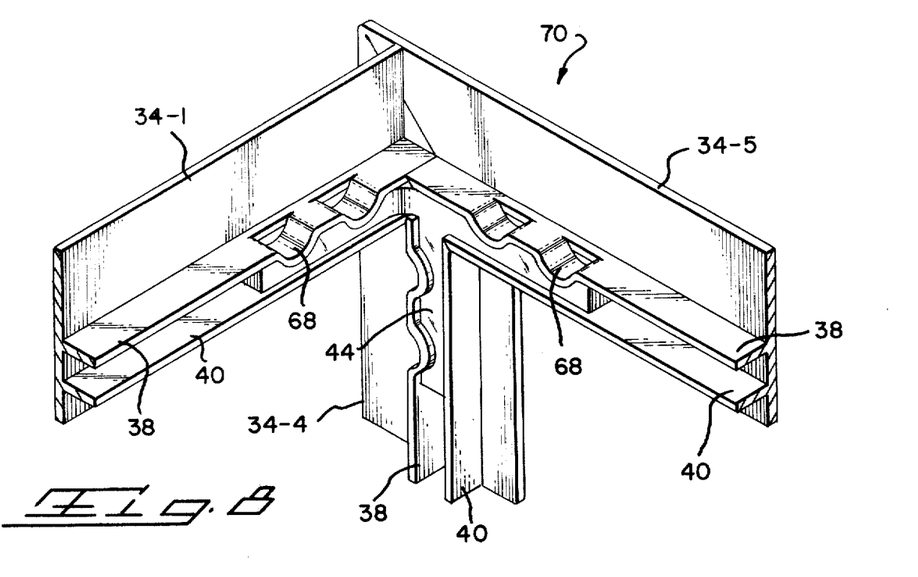
FIG. 8 is a perspective view of another form of corner joint in accordance with the invention.

FIG. 8 shows a corner joint formed among structural members 34-1, 34-5, and 34-4, this joint being a mirror image of the structural corner joint shown in FIG. 6. The structural members 34-4 and 34-5 are identical to the previously described structural members 34 of FIG. 6 and this joint is made with a connector member 44', FIG. 9, which is a mirror image of connector 44 shown in FIG. 7. In a typical cabinet or box frame then, the corner joint of FIG. 8 would comprise the upper right rear corner while the corner joint of FIG. 6 would comprise the upper left corner of the frame. These two forms of corner joint are used in other locations in the frame as shown in FIG. 10 and as described immediately below.

Figure 10:
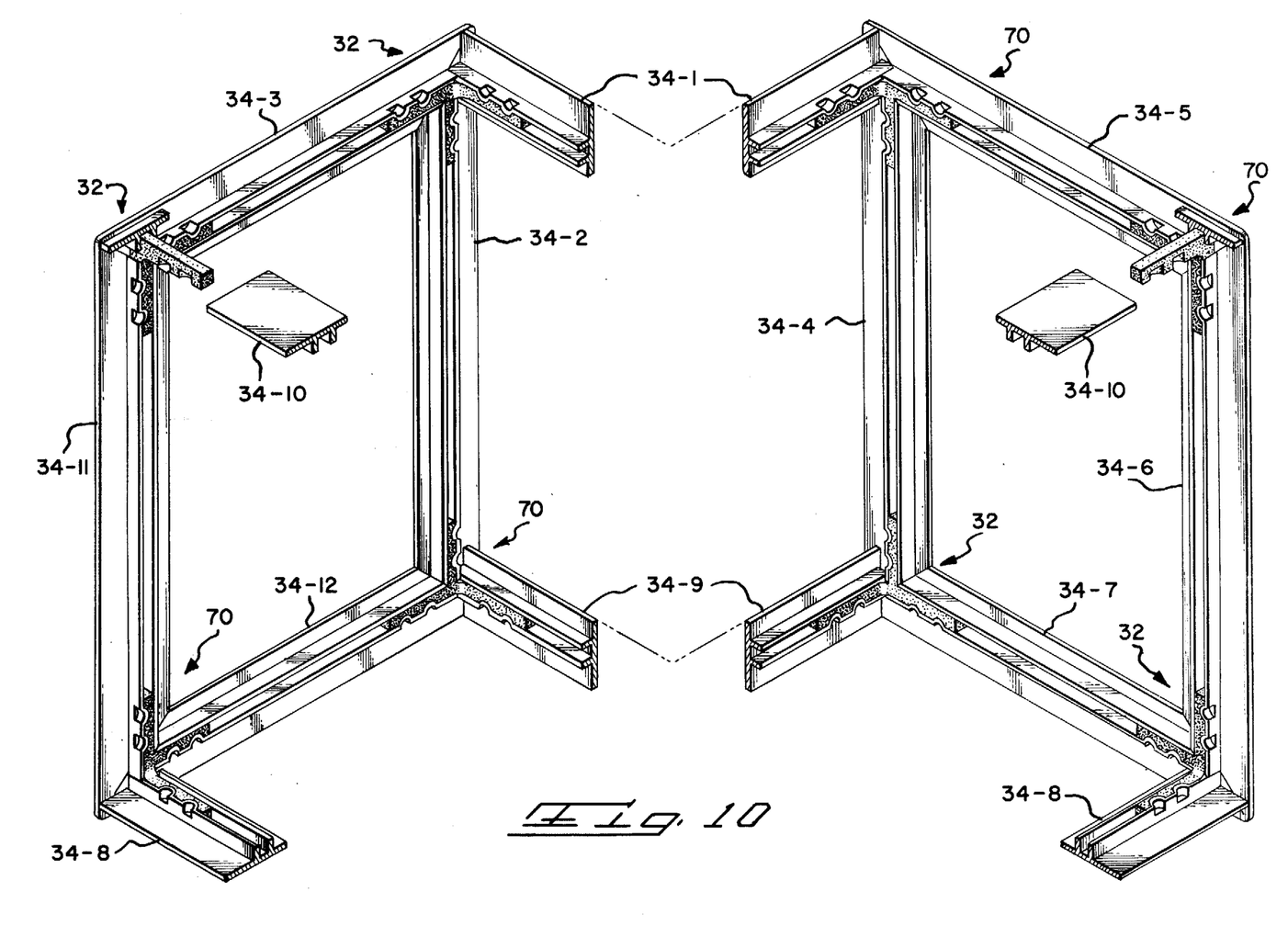
FIG. 10 is a perspective view, with parts broken away, of a typical cabinet frame having corner joints in accordance with the invention and showing the manner in which the two types of joints shown in FIGS. 6 and 8 are employed in the frame.

FIG. 10 shows a cabinet or box frame having structural frame members, 34-1, 34-2, 34-3, * * * 34-12, the lefthand side or end of the frame being formed by structural members 34-2, 34-3, 34-11 and 34-12 while the righthand side end of the frame is formed by a structural members 34-5, 34-4, 34-6, and 34-7. These two ends are connected to each other by transverse frame members 34-1, 34-9, 34-8, and 34-10. In each of the eight corners of the frame, the converging structural members are secured to each other by one of the two types of corner joints 32, 70 shown in FIGS. 6 and 8 respectively. It will be apparent from an inspection of FIG. 10 that the upper left rear, upper left front, a lower right rear, and lower right front joints are of the type shown at 32 in FIG. 6. The upper right rear, upper right front, lower left rear and lower left front joints are on the other hand, of the type shown at 70 in FIG. 8. It is thus apparent that all of the required joints of the frame can be obtained with the two connector members 44, 44' described above. It should be noted that the transverse structural members 34-1, 34-8, 34-9, and 34-10 can be oriented in either the vertical or horizontal plane of FIG. 10 if the proper corner joints 32, 70 are used in the appropriate corner.

Figures 11, 13:
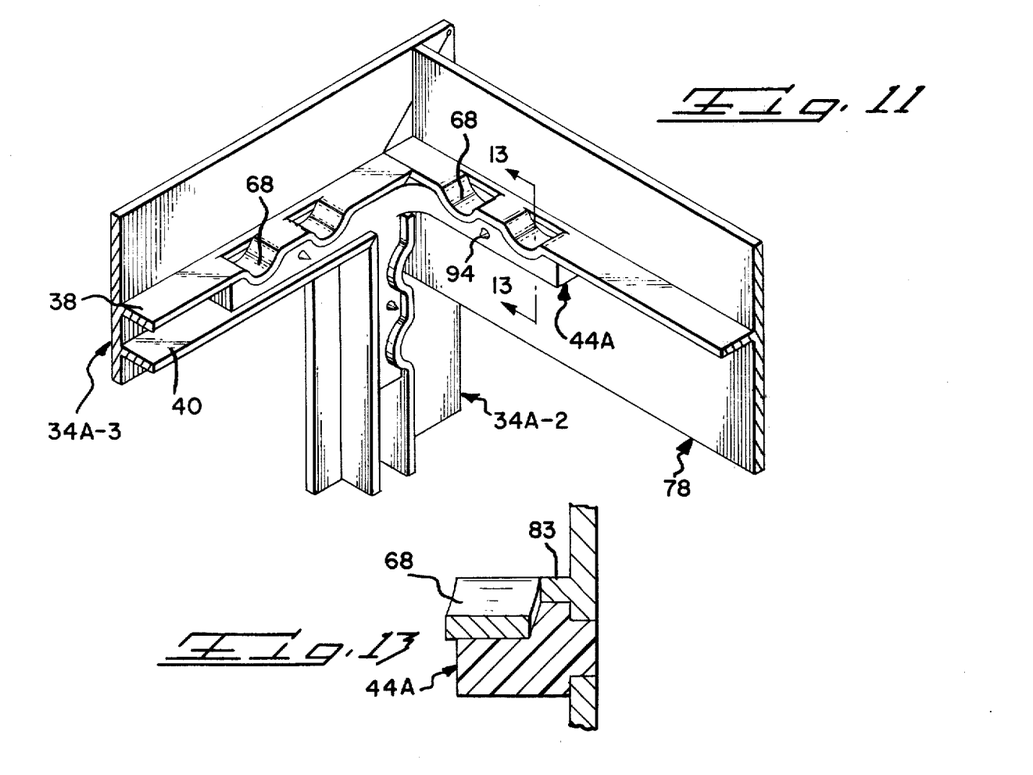
FIG. 11 is a perpsective view of a third type of corner joint in accordance with the invention.
FIG. 13 is a sectional view taken along the lines 13—13 of FIG. 11.
Figure 12:
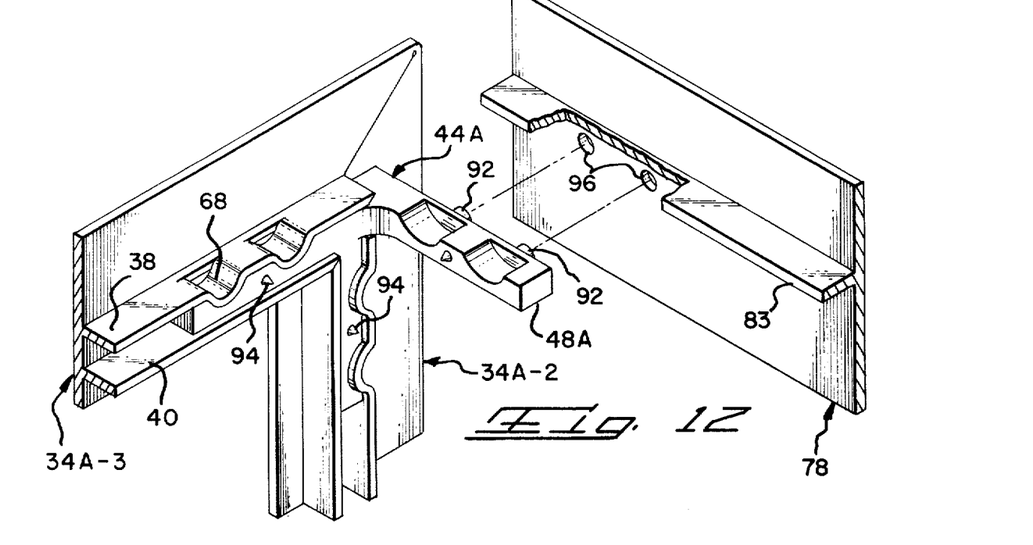
FIG. 12 is a perspective view of the joint of FIG. 11 showing one of the structural members of the joint exploded from one arm of the connecting member.

FIGS. 11–13 show an alternative embodiment of the invention comprising a corner joint formed of three structural members 34A-3, 34A-2, and 78. The structural members 34A-3 and 34A-2 are similar to the structural members 34 described above and meet at a mitered joint as previously described. The connecting member 44A has first and third arms which are located between the ribs 38 and 40 of these two structural members and fastenings 68 as previously described are formed to secure these arms to the members.

The structural member 78 is, in this embodiment, a simple extrusion having only a single rib 83 extending therefrom. This member, in the finished joint, extends normally from the members 34A-3 and 34A-2.

The connection between the second arm 48A of the connector 44A and the structural member 78 is achieved by providing cylindrical bosses 92 on the side of arm 48A which is opposed to the structural member 78 and forming holes 96 in the structural member at locations such that the bosses 92 will enter the holes preventing relative upward movement of the structural member with respect to the arm. The inwardly deformed portions 68 of the rib 83 prevent any movement in the horizontal plane as viewed in the drawing.

Referring now to FIG. 14A, the combination of bosses and recesses on the connector member can be employed to form a joint among three structural members 98, 100, 102 each of which has only one rib 104 extending from one of its sides. The connector 106 has bosses 108 extending from the sides which are opposite to the sides into which the recesses extend and holes are drilled in the structural members 98, 100, 102 as indicated. The combination of crimped connections between the single rib 104 of the structural members and the interengagement of the bosses and the holes will secure the structural members firmly with respect to each other so that they cannot move.

Figure 14:
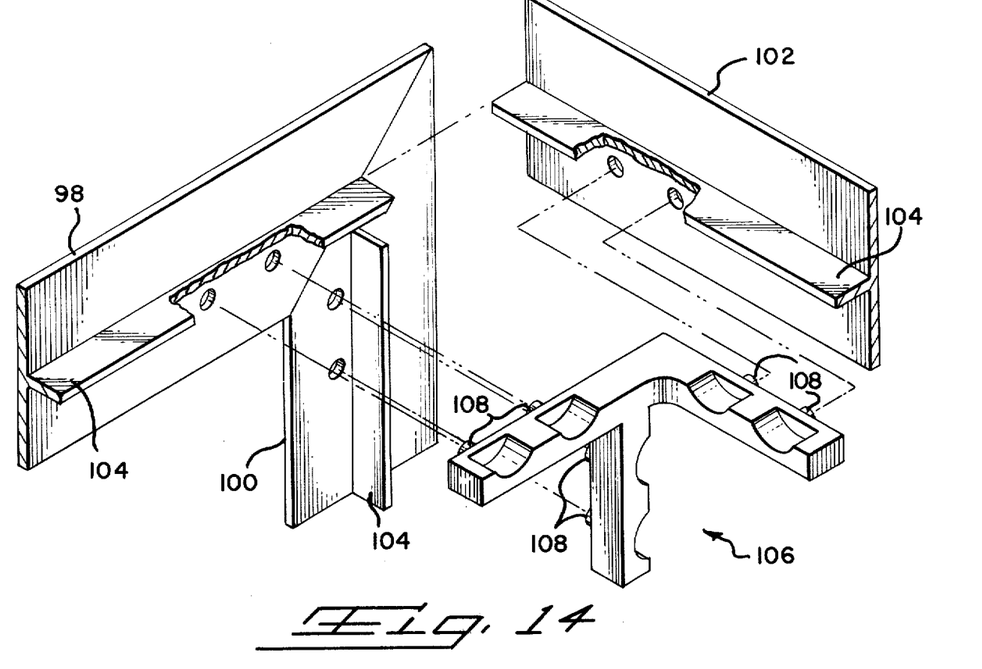
FIG. 14A is a perspective view, with the connector and one of the structural elements exploded, of another form of corner joint in accordance with the invention.
FIG. 14B is a perspective view of still another form of corner joint in accordance with the invention.
Figure 14B:
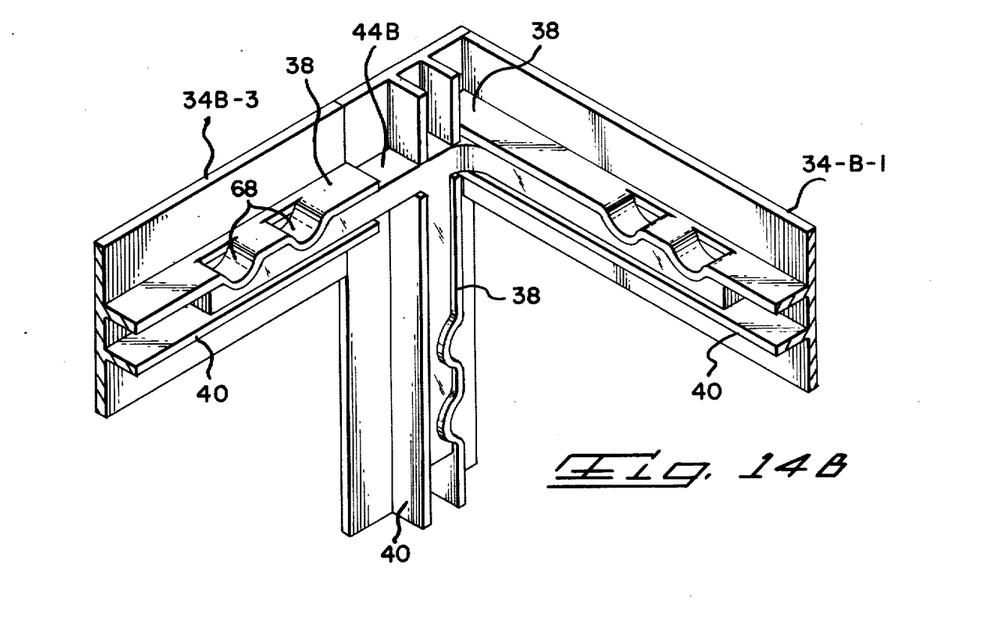
Figures 15, 16, 17:
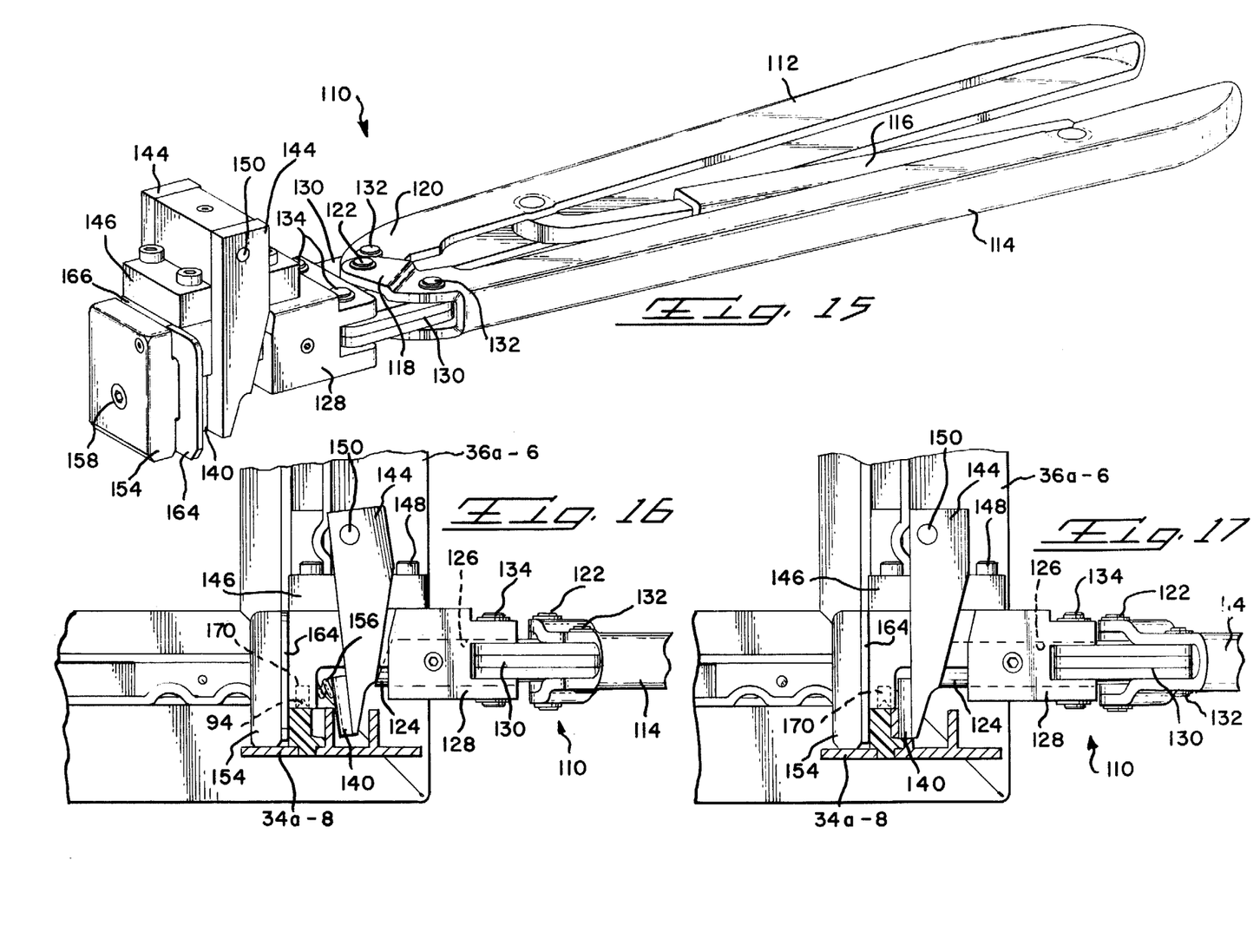
FIG. 15 is a perspective view of one form of crimping tool for crimping the connector member to the structural members of the corner joint.
FIG. 16 is a fragmentary side view showing the tool of FIG. 17 located on one of the structural members of a corner joint preparatory to forming the crimped connections between the structural member and the connector member.
FIG. 17 is a view similar to FIG. 18 but showing the positions of the parts at the completion of the crimping operation.
Figure 18:
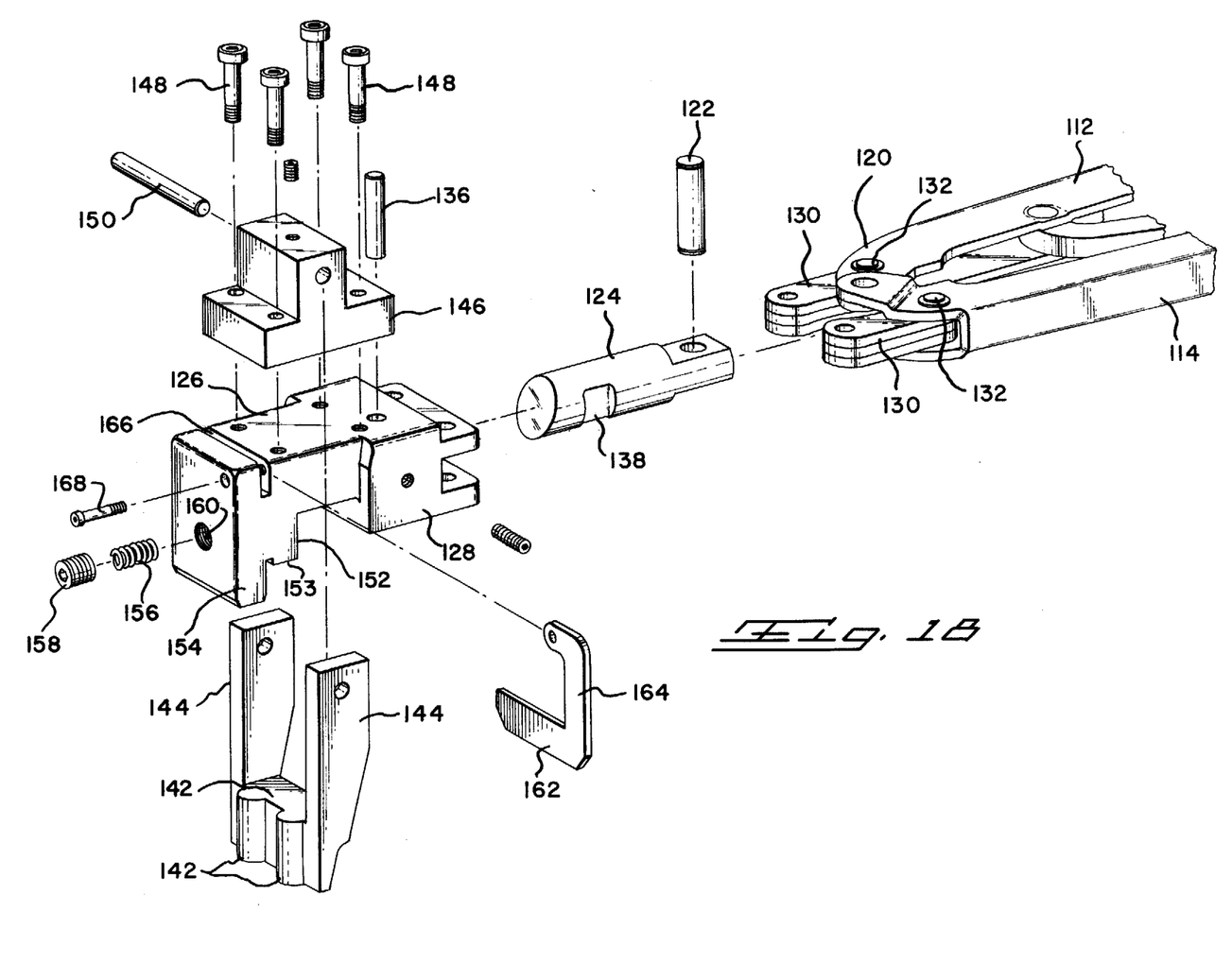
FIG. 18 is a perspective exploded view of portions of the head portion of the tool of FIG. 17.
Figure 19:
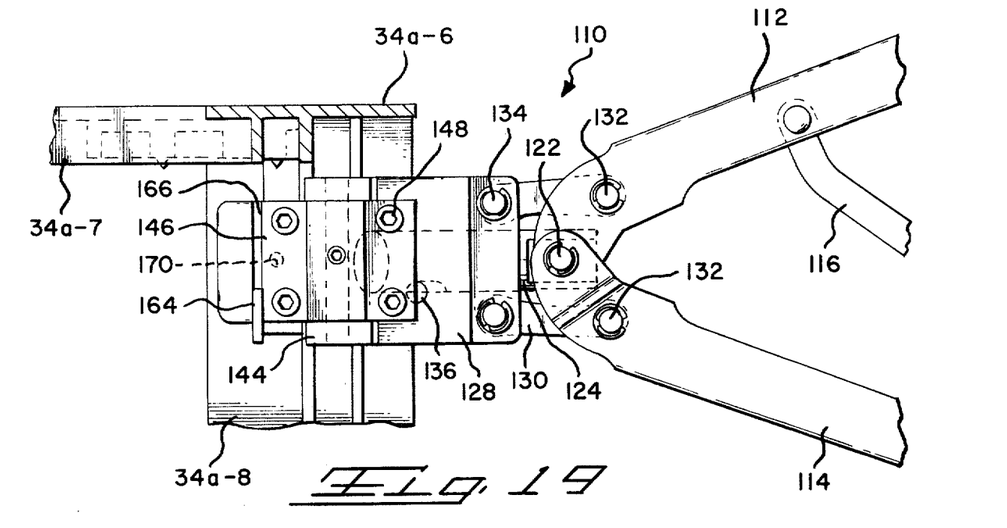
FIG. 19 is a plan view of the tool of FIG. 17 in position on one of the structural members of a corner joint.
Figure 20:
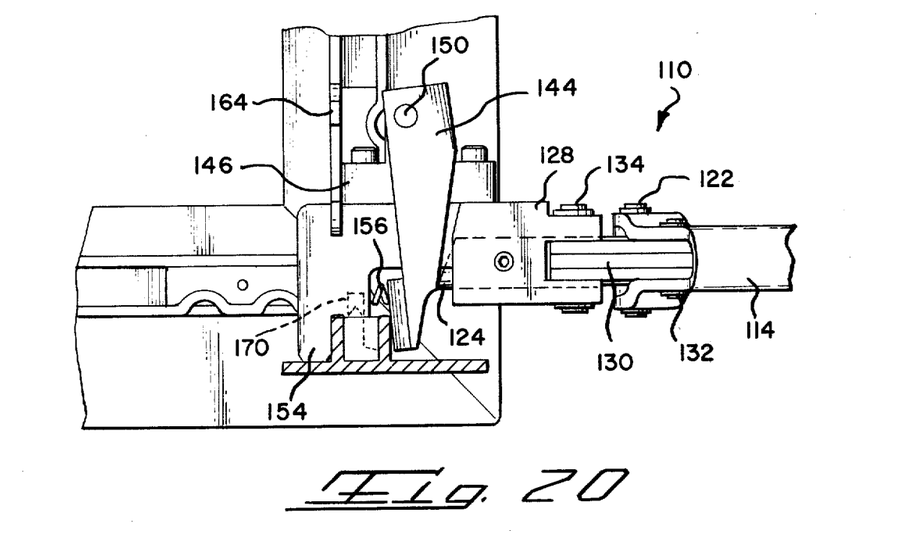
FIG. 20 is a view similar to FIG. 18 but illustrating the formation of an alternative form of corner joint.

FIG. 14B shows a further embodiment of the invention in which the structural members 34B-2 and 34B-3, which lie in one plane, are arranged with the end of 34B-3 abutting the side of 34B-2. The structural member 34B-1 is positioned against structural member 34B-2 with the ribs 38, 40 of this structural member in alignment with the ribs of the structural member 34B-3. The ribs 38, 40 of structural member 34B-2 are cut away as indicated adjacent to the upper end of this member so that the connector member 34B can be positioned with its arms disposed between the ribs of the three structural members. Again, the arms of the connector member are fastened to the structural members by indentations 68 as described above. The corner joint shown in FIG. 14B can be used where it is desired to avoid the use of a mitered joint.

It is advantageous to crimp the ribs of the structural members into the recesses of the connector members by means of a suitable hand tool which may be of the general type shown in FIG. 15–20. This tool 110 comprises a pair of generally channel-shaped handles 112, 114 which are interfitted at their upper ends and pivoted to each other by a pin 122. A conventional full stroke compelling mechanism 116 may be provided on the handles as taught by U.S. Pat. No. 2,618,993 so that the operator is compelled to completely crimp the ribs into the recesses after he has initiated a crimping operation.

The pivot pin 122 extends through a ram 124 contained in a bore in a tool head frame block 126. Links 130 on each side of the ram are pivoted at their lefthand ends to the head block 126 and have their righthand ends pivoted to the handles 114, 112. It will thus be apparent that when the handles are closed, the ram is driven leftwardly in FIG. 21 to actuate the rib crimping tooling as described below.

The ribs of the structural members are indented by a pair of generally semi-cylindrical projections 140 on a dieblock 142. Arms 144 extend upwardly, as viewed in FIG. 18, from each side of this die block and straddle the intermediate portion of the frame block 128. At their upper ends, these arms are pivotedly mounted on a pin 150 which is extends through a mounting block 146 secured to the upper surface of the frame block 128 by suitable fasteners 148. The die block 142 is normally located in a recess 152 on the underside of the frame block and in opposed relationship to a depending lip 154 on the frame block. This lip has a flat surface which opposes the dies and which is adapted to support the rib on the structural member during a crimping operation. The ram 124 is normally rightwardly as viewed in FIG. 18 by means of a spring 156 contained in a threaded opening 160 in the head. This spring is retained in the opening by a suitable set screw 158 and bears against the bevelled face of the ram 124. When the handles are closed, the ram is moved leftwardly as viewed in FIGS. 18 and 19 against the biasing force of this spring. The stroke of the ram 124 is preferably limited by means of a suitable pin 136 mounted in a drilled transversely extending hole in the frame block and extending through a recess 138 on one side of the ram.

In order to permit a single tool 110 to be used for making crimped joints of the type shown in FIG. 14 and the type shown in FIG. 6, it is desirable to mount a shim or spacer 162 on the tool which can be placed against the lip 154 or removed from the lip depending upon the type of crimped connection being made. This spacer 162 is integral with an arm 164 pivoted at its upper end on a pin 168 in a slot 166 in the tool head.

When a crimped connection of the type shown in FIG. 14 is being formed, the shim or spacer is swung about its pivotal axis 168 so that it is located against the surface of the lip 154. The tool is then positioned on the structural member 34A (FIG. 16) with the die block 142 positioned between the ribs on the structural member as shown and with the spacer disposed against the leftwardly facing (as viewed in FIG. 16) side of the arm of the connector member. The two handles are then closed so that the indentors 140 will move from the position of FIG. 16 to the position of FIG. 17. The lower edges of these indentors, cooperate with the edges identified at 21 in FIG. 2 of the connector arm to shear the rib and deform the wall portions of the rib inwardly as illustrated. As noted above, the tool is provided with a full stroke compelling mechanicsm so that the rib will be completely crimped into the recesses and a secure and sound fastening will be obtained.

When a crimped connection of the type shown in FIG. 6 is being formed, the shim 162 is swung away from the lip 154 and the steps described above are followed to crimp the rib into the connector arm.

It is desirable to provide means to accurately locate the tool on the structural member and with relation to the arm of the connector member. To this end, I prefer to provide a conical locating boss 94 on each arm of the connecting or connector member. This locating boss is adapted to enter a hole 170 extending upwardly into the surface 153 on the underside of the head and which is so located such that the indentors 140 will be precisely positioned with respect to the recesses on the arm of the connector.

Figure 2:
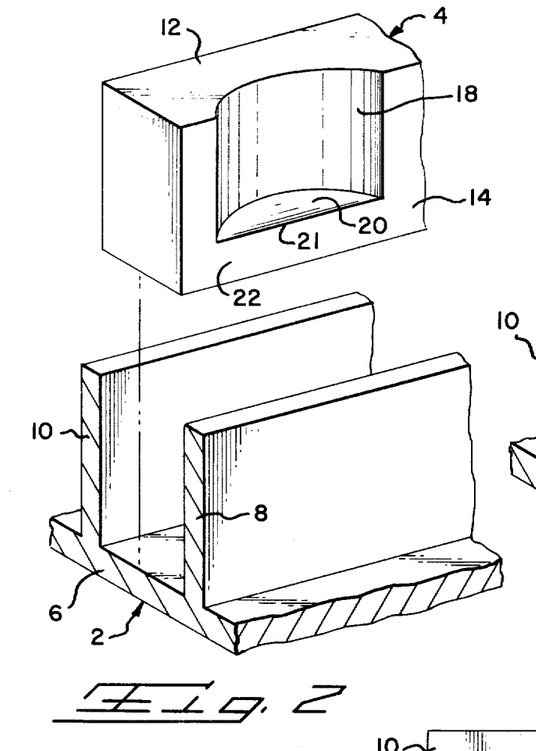
FIG. 2 is a fragmentary perspective view showing the two members exploded from each other prior to their being fastened to each other.

A variety of types of tools might be employed to form fastenings in accordance with the invention. The disclosed type of crimping tool has one particular advantage in that the crimping projections 140 move along an arcuate path when the rib of structural member is deformed into the recess of the connector. This arcuate movement is advantageous in that the shoulder 20 of the connector is inclined upwardly from the edge 21 as shown in FIG. 2. The path of the lower end of the crimper approximately follows the inclination of the shoulder so that the indented portion of the rib is not jammed into the recess but bears against the shoulder of the recess and the connector is cammed downwardly as previously described.

Numerous alternative embodiments, modifications, and alternative uses of the invention will be apparent to those skilled in the art. As pointed out above, the fastening in accordance with the instant invention can be used under a wide variety of circumstances other than those specifically disclosed herein. It should also be pointed out that fastenings in accordance with the invention can be formed by providing recesses which extend inwardly on both sides of the connector member to which connection is made rather than on only one side. It is preferable as disclosed herein to shear the rib of the structural member (or the corresponding part of the members being connected, whatever they are) although results can sometimes be obtained without full or with only partial shearing.

Some uses for corner joints in accordance with the invention are building frames, furniture in addition to cabinets, interior building partitions, and frames of the general type used to support printed circuit boards and commonly referred to as card guide racks. Although I choose to show right angle corner joints in the appended drawing, it will be apparent that connectors and corner joints in which the structural members extend from each other at angles other than right angles are within the scope of the invention.

Changes in construction will occur to those skilled in the art and various apparently different modifications and embodiments may be made without departing from the scope of the invention. The matter set forth in the foregoing description and accompanying drawings is offered by way of illustration only.

I claim:

1. A connecting device for forming a corner joint among three structural members, said device comprising:
   first, second, and third arms said arms having rectangular cross sections,
   said first and second arms being perpendicular to each other and defining a first plane, said first and second arms having sides which are substantially parallel to said first plane, said third arm extending perpendicularly from said first arm at a location spaced from the juncture of said first and second arms, said first and third arms defining a second plane which extends normally of said first plane, said third arm having sides which are substantially perpendicular to said second plane, recesses on at least one of said sides of each of said arms, said recesses extending partially across said sides and being adapted to receive portions of said structural members, and projections on said second arm on one side which is between said sides, said projections being adapted to be received in said structural members whereby, said first and third arms can be located between parallel ribs on two structural members extending perpendicularly with respect to each other and abutting each other, and said second arm can be located against a rib on an additional structural member which abuts, and extends normally from, said first and second structural members, said structural members being securable to said device upon deformation of said ribs into said recesses.

2. A corner joint comprising first, second, and third structural members, said first and second members lying in one plane and being against each other in a mitered joint, said third member abutting said first and second members and lying in another plane which extends transversely of said first plane, said first and second members having at least one rib extending therefrom and providing a surface thereon which extends transversely of said one plane, and said third member having a rib providing a surface thereon which extends transversely of said other plane, said corner joint comprising:

a connecting device having first, second, and third arms, said first and second arms being joined at one end of said first and second arms and defining a first plane, said third arm extending from said first arm at a location spaced from the juncture of said first and second arms, said first and third arms defining a second plane which intersects said first plane, said first and third arms being against said surfaces on said first and second members, and said second arm being against said surface on said third member, fastening means effective between said arms, said surfaces, and said members, said fastening means securing said arms against movement away from said members normally of said one plane and said other plane and securing said arms against movement away from said surfaces and parallel to said one plane and said other plane whereby said members are secured to said arms and thereby to each other.

3. A corner joint as set forth in claim 2 wherein said fastening means comprises interengaging means effective between said arms and said members and between said arms and said ribs.

4. A corner joint as set forth in claim 3 wherein interengaging means between said arms and said members comprises holes in said members and projections on said arms, said projections extending into said holes.

5. A corner joint as set forth in claim 3 wherein said interengaging means between said arms and said ribs comprises recesses in said arms on the sides thereof which are against said ribs, said ribs being deformed into said recesses.

6. A corner joint as set forth in claim 2 wherein each of said members has a pair of parallel spaced-apart ribs thereon, said arms being between said ribs whereby said surfaces comprise one side of one of said ribs on each of said members.

7. A corner joint as set forth in claim 6 wherein said fastening means comprises recesses on sides of said arms which are against sides of said ribs, said ribs having deformed portions extending into said recesses.

8. A corner joint as set forth in claim 7 wherein said recesses extend only partially across said sides of said arms, said deformed portions of said ribs being severed from said ribs whereby edge portions of said ribs bear against the inner ends of said recesses.

9. A corner joint comprising first, second and third structural members, said first and second members lying in one plane and being against each other in a mitered joint, said third member abutting at least one of said first and second members and lying in another plane which extends transversely of said one plane, each of said members having a pair of parallel ribs on one side thereof, said ribs of said first and second members being in alignment with each other at said joint, said joint comprising:

a connecting device having first, second, and third arms, said first and second arms being joined at one end of said first and second arms and defining a first plane, said third arm extending from said first arm at a location spaced from the juncture of said first and second arms, said first and third arms defining a second plane which intersects said first plane, said first and third arms being between said ribs of said first and second members, and said second arm being against at least one of said ribs of said third member, and, securing means securing said members to said arms whereby, said members are held substantially immovably with respect to each other.

10. A corner joint as set forth in claim 9 wherein said second arm is disposed against only one of said ribs of said third member.

11. A corner joint as set forth in claim 9 wherein said means securing said members to said arms comprises recesses in said arms on the sides thereof which are against said ribs, said ribs being deformed into said recesses.

12. A corner joint as set forth in claim 11 wherein said recesses extend only partially across said sides of said ribs, portions of said ribs being severed from said ribs whereby edge portions of said ribs bear against the inner ends of said recesses.

13. A connecting device as set forth in claim 10 wherein said securing means comprises at least one hole in said third member and a projection on said second arm, said projection extending into said hole.

14. A fastening between a first member and a second member, said first member having a web and sidewalls and being of material capable of being permanently deformed, said second member being solid and fitting snugly between said web and sidewalls, said fastening comprising:
- a recess extending into said second member on one side thereof which is against one of said sidewalls, said recess having an inner end which defines a shoulder, said shoulder exteding transversely of said one sidewall,
- said one sidewall having deformed portions extending into said recess, said deformed portions being severed from said one sidewall to provide an edge, said edge bearing against said shoulder whereby, the engagement of said deformed portions and said edge with surface portions of said recess secure said members to each other.

15. A fastening as set forth in claim 14, said first member comprising an aluminum extrusion, said extrusion including portions extending laterally beyond said sidewalls.

16. A fastening between a structural member having the properties of an aluminum extrusion and a fastening member, said structural member having a web and a pair of parallel ribs extending from said web, said fastening member being of hard material,
- said fastening member being between said ribs and occupying substantially all of the space between said ribs for a portion of the length of said structural member,
- a recess in said fastening member on one side thereof, said side being against one of said ribs, said recess being generally semi-cylindrical providing a shoulder which extends transversely of said one side
- said one rib having deformed portions extending into said recess, said deformed portions being severed from said one rib to provide an edge, said edge bearing against said shoulder, said deformed portions and said shoulder securing said fastener to said structural member.

17. A connecting device for forming a corner joint among three structural members, each of said members having a web and having spaced apart sidewalls extending from said web, said connecting device being solid and being of a relatively hard material, said connecting device comprising:
- first, second and third arms, said first and second arms being joined at one end of said first and second arms and defining a first plane, said third arm extending from said first arm at a location spaced from the juncture of said first and second arms, said first and third arms defining a second plane which intersects said first plane,
- said arms having arm sections conforming to the cross sections of said structural members, said arms being dimensioned to fit snugly between said sidewalls of said structural members,
- said arms having recesses extending at least partially into sides thereof which are adapted to be located against said sidewalls whereby, upon positioning said structural members against each other and locating said connecting device between said sidewalls of said structural members, and upon deforming said sidewalls into said recesses, said structural members are secured to said connecting device and thereby to each other.

18. A device as set forth in claim 17 wherein said recesses are generally semi-cylindrical, each recess having an inner end which extends transversely of the plane of the arm in which each recess is located.

19. A device as set forth in claim 17, said sidewalls of said structural members extending parallel to each other in each structural member, said arms having rectangular cross sections, said recesses being generally semi-cylindrical, said recesses in said first and second arms having inner ends which extend transversely of said first plane, said recess in said third arm having an inner end which extends generally parallel to said plane.

* * * * *